US009148909B2

(12) United States Patent
Liang (10) Patent No.: US 9,148,909 B2
(45) Date of Patent: *Sep. 29, 2015

(54) MOBILE TERMINAL (75) Inventor: Xiguang Liang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 324 days.

This patent is subject to a terminal disclaimer.

(21) Appl. No.: 13/820,988

(22) PCT Filed: Feb. 23, 2011

(86) PCT No.: PCT/CN2011/071192
§ 371 (c)(1),
(2), (4) Date: Mar. 5, 2013

(87) PCT Pub. No.: WO2012/031470
PCT Pub. Date: Mar. 15, 2012

(65) Prior Publication Data
US 2013/0178171 A1 Jul. 11, 2013

(30) Foreign Application Priority Data
Sep. 6, 2010 (CN) .......................... 2010 1 0274114

(51) Int. Cl.
*H04M 1/738* (2006.01)
*H04W 76/02* (2009.01)
(Continued)

(52) U.S. Cl.
CPC .............. *H04W 88/06* (2013.01); *H04M 1/725* (2013.01); *H04M 1/738* (2013.01); *H04W 76/02* (2013.01); *H04W 88/02* (2013.01)

(58) Field of Classification Search
CPC ............ H04M 1/725; H04M 1/72519; H04M 2250/02; H04M 1/2535; H04M 2203/1091; H04M 7/0069; H04W 88/021; H04W 84/14; H04W 88/18; H04W 92/02; H04W 92/18; H04W 4/18; H04W 80/00; H04W 88/06; H04W 88/16; H04W 8/26; H04L 12/28; H04L 12/66; H04L 65/1036
See application file for complete search history.

(56) References Cited

U.S. PATENT DOCUMENTS 5,787,365 A * 7/1998 Rivero et al. ................. 455/567
6,615,051 B2 * 9/2003 Saarela ......................... 455/522
(Continued)

FOREIGN PATENT DOCUMENTS

CN 2862539 1/2009
CN 201274576 7/2009
(Continued)

OTHER PUBLICATIONS

International Search Report mailed Jun. 16, 2011 in PCT/CN2011/071192 in 3 pages.

*Primary Examiner* — Lewis West
(74) *Attorney, Agent, or Firm* — Knobbe, Martens, Olson & Bear, LLP (57) ABSTRACT

The disclosure provides a mobile terminal, comprising: a fixed network access control module, configured to connect mobile terminal with analogue subscriber line and notify central processor that the mobile terminal is connected with fixed telephone network when analogue subscriber line is connected with analogue subscriber line interface, a frequency shift keying processing module, configured to identify the signaling from the analogue subscriber line, then send the signaling to the central processor, and to identify the signaling from the central processor, and then send the signaling to the analogue subscriber line, a call processing module, configured to extract the voice signal from the analogue subscriber line and send the voice signal to the voice output device of the mobile terminal to be played, and send the voice signal from the user to the analogue subscriber line, a mobile communication module, and a central processor.

20 Claims, 9 Drawing Sheets

(51) Int. Cl.
*H04W 88/02* (2009.01)
*H04W 88/06* (2009.01)
*H04M 1/725* (2006.01)

(56) References Cited

U.S. PATENT DOCUMENTS

| | | | |
|---|---|---|---|
| 7,024,189 B2 * | 4/2006 | Wonak et al. | 455/426.2 |
| 7,657,284 B1 * | 2/2010 | Specht | 455/556.1 |
| 8,285,311 B2 * | 10/2012 | Hundal | 455/462 |
| 2002/0065076 A1 * | 5/2002 | Monroe | 455/426 |
| 2004/0203482 A1 * | 10/2004 | Bacon et al. | 455/74.1 |
| 2009/0075602 A1 * | 3/2009 | Alexis | 455/74.1 |
| 2010/0159849 A1 * | 6/2010 | Tischer et al. | 455/74 |

FOREIGN PATENT DOCUMENTS

| | | |
|---|---|---|
| CN | 201332429 | 10/2009 |
| GB | 2467854 | 8/2010 |

\* cited by examiner

MOBILE TERMINAL

CROSS-REFERENCE TO RELATED APPLICATIONS

This application is the U.S. National Phase application under 35 U.S.C. §371 of International Application PCT/CN2011/071192, filed Feb. 23, 2011, which claims priority to Chinese Application 201010274114.7, filed Sep. 6, 2010.

FIELD OF THE INVENTION

The invention relates to the field of communication, and in particular to a mobile terminal.

BACKGROUND OF THE INVENTION

With the continuous development of the telecommunication network, the broadcast-TV network and the Internet, at present, it is proposed that the three networks should be converged together. The "triple-play" technology is currently under development. Through the convergence of the three networks, interconnection and resource sharing can be realized among the three networks to provide various services to users, such as voice, data and broadcast TV. Actually, the triple-play is essentially the convergence of services. And, the convergence of services eventually reflects on the terminals. Therefore, how to design reasonable terminals according to the demands of triple-play becomes an important factor in realizing triple-play.

With the continuous expansion of the communication service scale of the mobile communication system, the limit of the capacity of the mobile communication system due to the finiteness of the radio resources (radio frequency spectrums) has been shown. The industry has considered and is preparing to combine the finite radio resources and the relatively infinite wired resources, to fully utilize the existed fixed communication network resources to improve the capacity of the mobile communication system and the user experience.

On the other hand, with the development of the society, people are more concerned about the environment. More and more people are aware of the hazards of radio waves to the health. Simultaneously, for quite a number of mobile users, they stay in an environment with fixed telephone network access resources in most occasions without needing mobile communication. For example, when the user stays in the office or at home, it is very possible that there is a fixed telephone beside the user and the user also takes the mobile phone along. But, other users calling this user may not know whether there is a fixed telephone in the environment where the user stays. Then, when in communication with the user, they still call the mobile phone of the user, which obviously wastes resources and causes unnecessary damages to the environment and the health.

However, the related mobile terminals are unable to utilize more environmentally-friendly wired communication modes to perform communication. No effective solution has been proposed in the related art.

SUMMARY OF THE INVENTION

In allusion to the problems of serious waste of resources when in communication and considerable damage to the health and the environment caused as the mobile terminals are unable to utilize wired communication modes to perform communication in the related technologies, the disclosure proposes a mobile terminal, a fixed communication network access processing module is added in the related mobile terminals, so that not only the flexibility of the related mobile terminals is maintained, but also the fixed network communication resources can be utilized to perform communication in wired mode.

The technical solution of the disclosure is implemented as follows.

According to one aspect of the disclosure, a mobile terminal is provided.

The mobile terminal comprises a central processor, a fixed network access control module, a frequency shift keying processing module, a call processing module, a mobile communication module and an electronic switch module.

Specifically, the fixed network access control module is connected with the central processor, comprises an analogue subscriber line interface, and is configured to connect the mobile terminal and an analogue subscriber line, and to notify the central processor that the mobile terminal is connected with a fixed telephone network when the analogue subscriber line is connected with the analogue subscriber line interface; the frequency shift keying processing module is connected with the central processor, and is configured to identify a signaling from the connected analogue subscriber line and send the signaling from the connected analogue subscriber line to the central processor, and to identify a signaling from the central processor and send the signaling from the central processor to the connected analogue subscriber line; the call processing module is configured to extract a voice signal from the analogue subscriber line and send the voice signal from the analogue subscriber line to a voice output device of the mobile terminal to be played, and to send a voice signal from a user to the analogue subscriber line; the mobile communication module is configured to achieve communication between the mobile terminal and outside based on a radio network; and the central processor is configured to process a signaling from the frequency shift keying processing module and send a signaling to be transmitted by the subscriber line to the frequency shift keying processing module, and to control the electronic switch module to close a radio frequency sending/receiving function of the mobile communication module when the fixed network access control module notifies that the mobile terminal is connected with the fixed network.

The mobile terminal may further comprise: a ringing current processing module, connected with the central processor, and configured to identify a ringing current signal from the analogue subscriber line and report a ringing corresponding to the ringing current signal to the central processor.

In addition, the central processor is further configured to determine whether a called number received by the frequency shift keying processing module is a user number of the mobile terminal, and if yes, control the mobile terminal to continue to perform incoming call processing.

Furthermore, the electronic switch module is further configured to, under control of the central processor, enable at least one of the frequency shift keying processing module, the call processing module and the ringing current processing module to be connected with the analogue subscriber line.

In addition, the central processor is further configured to control the electronic switch module to connect the ringing current processing module with the analogue subscriber line when the mobile terminal accesses the fixed telephone network.

Further, the central processor is further configured to control the electronic switch module to connect the call processing module with the analogue subscriber line when the mobile terminal needs to perform voice communication.

Furthermore, the central processor is further configured to control the electronic switch module to connect the frequency shift keying processing module with the analogue subscriber line when the mobile terminal performs short message transmission.

In addition, the mobile terminal may further comprise an audio input module and an audio output module; and the call processing module may be further configured to send the voice signal from the user, which is input through the audio input module, to the analogue subscriber line, and send the voice signal from the analogue subscriber line to the voice output module.

Optionally, the central processor may be one of the following: a baseband processor and a central processing unit.

The technical solution of the disclosure reconstructs the mobile terminal, and sets the functional modules for signaling transmission, voice signal transmission and analogue subscriber line. Thus, the mobile terminal can access and stay in the fixed telephone network, and can perform voice signal transmission and signaling (including short message) transmission with the fixed telephone network through the analogue subscriber line. Therefore, the convergence of mobile communication and fixed telephone network communication is realized for the mobile terminal. On the basis of maintaining the mobile communication function, the function of the wired communication is added. Hence, the hazard of radio waves to health and environment is reduced, and the radio resources are saved.

DETAILED DESCRIPTION OF THE EMBODIMENTS

There is the problem in the related art that the mobile terminals are unable to utilize wired communication mode to perform communication, which causes serious waste of communication resources and considerable damage to health and environment. And, the present fixed telephone network technology is mature, the network coverage is comprehensive, and the scale of the network still is developing and expanding. The disclosure proposes to reconstruct the mobile terminal, so that the mobile terminal can access and stay in the fixed telephone network (hereinafter also referred to as fixed network), and can perform voice signal transmission and signaling (including short messages) transmission with the fixed telephone network through the analogue subscriber line. Thus, the convergence of mobile communication and fixed telephone network communication is realized for the mobile terminal. On the basis of maintaining the mobile communication function, the function of the wired communication is added. The hazards of radio waves to health and environment are reduced, and the radio resources are saved.

The disclosure is described below in detail with reference to the drawings.

Figure 1:
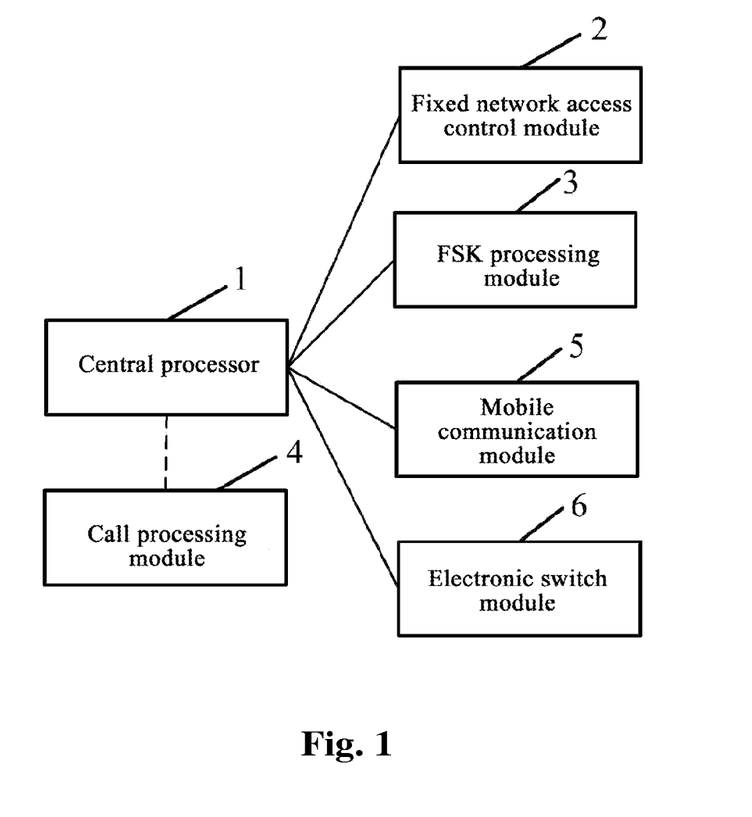
FIG. 1 is a structure block diagram of a mobile terminal according to an embodiment of the disclosure.

FIG. 1 is a structure block diagram of a mobile terminal according to an embodiment of the disclosure. As shown in FIG. 1, the mobile terminal comprises a central processor 1, a fixed network access control module 2, a ringing current processing module (not shown in FIG. 1), a frequency shift keying processing module 3, a call processing module 4, a mobile communication module 5 and an electronic switch module 6.

The fixed network access control module 2 is connected with the central processor 1, comprises an analogue subscriber line interface, and is configured to connect the terminal with the analogue subscriber line, and to notify the central processor 1 that the mobile terminal is connected with a fixed telephone network when the analogue subscriber line is connected with the terminal. And, the fixed network access control module 2 is further configured to notify the central processor 1 that the mobile terminal is disconnected with the fixed telephone network when the analogue subscriber line is disconnected with the terminal, wherein the central processor 1 may be one of the following: the baseband processor and the central processing unit.

The frequency shift keying processing module 3 is connected with the central processor 1, and is configured to identify the signaling from the connected analogue subscriber line and send the signaling from the analogue subscriber line to the central processor 1, and to identify the signaling from the central processor 1 and send the signaling from the central processor 1 to the connected analogue subscriber line.

The call processing module 4 is configured to receive and process the voice signal from the analogue subscriber line and send the voice signal to the voice output device of the terminal to be played, and to receive and process the voice signal from the audio input device of the terminal and send the voice signal from the audio input device of the terminal to the analogue subscriber line. Specifically, the call processing module 4 mainly has the following functions: 2/4 wire conversion, sidetone removal and voice signal amplification, to extract the voice signal from the analogue subscriber line and send the voice signal from the analogue subscriber line to the voice output device of the terminal to be played, and to send the voice signal from the user to the analogue subscriber line.

The mobile communication module 5 is configured to achieve the communication between the mobile terminal and the outside based on the radio network.

The central processor 1 is configured to process the signaling from the frequency shift keying processing module 3, and send the signaling to be transmitted by network to the frequency shift keying processing module 3, and to control the electronic switch module 6 to close the radio frequency sending/receiving function of the mobile communication module 5 when the fixed network access control module 2 notifies the central processor 1 that the mobile terminal is connected with the fixed network. Further, the central processor 1 overall controls all function logics of the terminal, processes the signaling from the signaling processing modules (the frequency shift keying processing module 3 and the ringing current processing module), and sends the signaling to be transmitted by the analogue subscriber line to the frequency shift keying processing module 3. When the fixed network access control module 2 notifies the central processor 1 that the mobile terminal is connected with the fixed telephone network, the central processor 1 implements fixed network access processing for the terminal, controls the electronic switch module 6 to close the radio frequency sending/receiving function of the mobile communication module 5, and controls the electronic switch module 6 to implement the connection between the ringing current processing module and the analogue subscriber line. When the fixed network access control module 2 notifies the central processor 1 that the mobile terminal is disconnected with the fixed telephone network, the central processor 1 implements fixed network exit processing for the terminal, controls the electronic switch module 6 to open the radio frequency sending/receiving function of the mobile communication module 5. That is, the central processor 1 overall controls the communication processing of the terminal. The central processor 1 processes the downlink signaling message from the signaling processing modules (the ringing current processing module and the frequency shift keying processing module), controls the frequency shift keying processing module to send the uplink user signaling to the subscriber line. The central processor 1 controls the call processing module, the ringing current processing module, the frequency shift keying processing module, the mobile communication processing module and the electronic switch module to work coordinately, to implement switch of the terminal between the mobile access mode and the fixed access mode and implement communication under the two modes. The central processor 1 is further configured to close the radio frequency sending/receiving function of the mobile communication module when the fixed network access control module notifies the central processor 1 that the mobile terminal has been connected with the fixed telephone network and the terminal enters the fixed network access mode. On the other hand, after the terminal is disconnected with the fixed network, the central processor opens the radio frequency sending/receiving function of the mobile communication module, and then the terminal enters the mobile access mode.

The ringing current processing module (not shown in FIG. 1) is connected with the central processor 1, and is configured to identify the ringing current from the analogue subscriber line and report the ringing signal to the central processor 1. In the specific implementation, the central processor 1 may be further configured to determine whether the mobile terminal is the called terminal according to the incoming called terminal identifier, and to control the mobile terminal to continue to perform the incoming call processing when determining that the mobile terminal is the called terminal.

The mobile terminal further comprises an audio input/output module (for example, the microphone and the earpiece) (not shown in FIG. 1). The call processing module is configured to send the voice signal generated by the user through the audio input module to the analogue subscriber line, and to send the voice signal from the analogue subscriber line to the audio output module.

In the above, the electronic switch module 6 is further configured to, under the control of the central processor 1, to enable at least one of the frequency shift keying processing module 3, the call processing module 4 and the ringing current processing module 5 to be connect with the analogue subscriber line.

Specifically, the central processor 1 may control the electronic switch module to execute the following operations. When the mobile terminal accesses the fixed telephone network, the central processor 1 is configured to control the electronic switch module to connect the ringing current processing module 5 with the analogue subscriber line. When the mobile terminal needs to perform voice communication, the central processor 1 is configured to control the electronic switch module to disconnect the ringing current processing module with the subscriber line, and to connect the subscriber line DC loop to connect the call processing module 4 with the analogue subscriber line. When the mobile terminal needs to perform short message transmission, the central processor 1 is configured to control the electronic switch module to disconnect the ringing current processing module with the subscriber line, and to connect the subscriber line DC loop to connect the frequency shift keying processing module 3 with the analogue subscriber line. And, the central processor 1 is further configured to, when the mobile terminal performs voice communication in the condition that there is wired access, control the electronic switch module to connect the audio input/output module with the call processing module.

As the mobile terminal in the disclosure converges functions of the fixed telephone network communication and the mobile network communication, the mobile terminal in the disclosure is also called as the converged terminal hereinafter.

Figure 2:
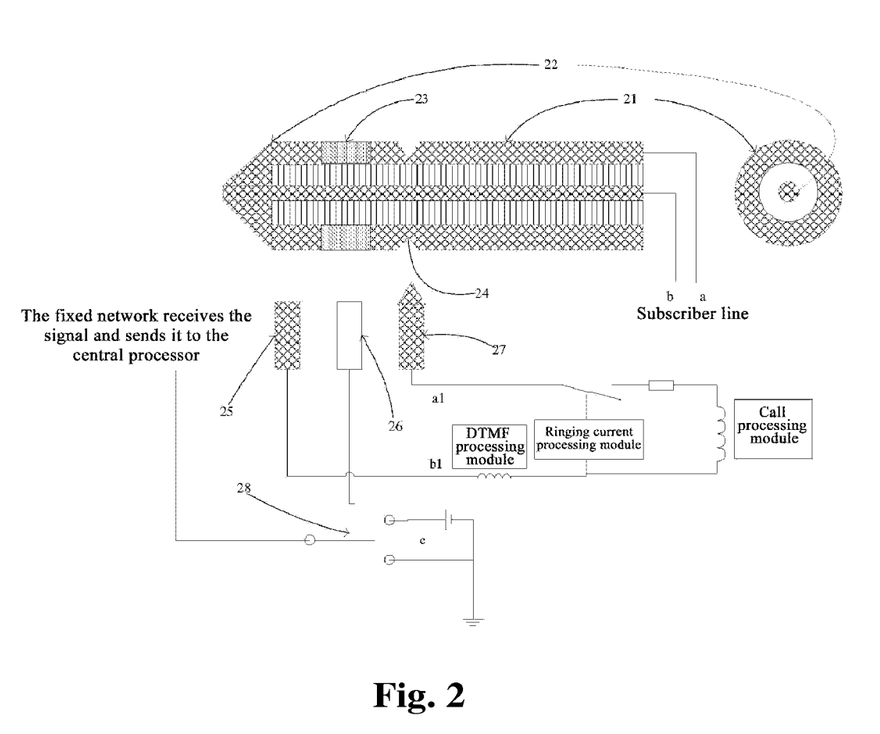
FIG. 2 is a diagram of a fixed network access control module in a converged terminal according to an embodiment of the disclosure.

FIG. 2 is a diagram of a fixed network access control module in a converged terminal according to an embodiment of the disclosure, mainly showing the possible shape of the subscriber line plug and the connection method of the subscriber line plug with the terminal. The plug may have many shapes. For example, the key switch may be controlled by the top of the plug. The location of the jack may be arranged at the lower part of the converged terminal. Through the fixed network access control module, on one hand, the line a1b1 inside the converged terminal may be connected with the analogue subscriber line (line ab) of the fixed telephone network, so that the converged terminal can be further connected with the fixed telephone network through the analogue subscriber line. On the other hand, the converged terminal also may detect the plug-in and plug-out of the plug in time, and notify the central processor that the terminal is connected or disconnected with the subscriber line, in order to start the processing logic of accessing and exiting the fixed network.

As shown in FIG. 2, the subscriber line plug is cylindrical. The upper left part shows the vertical section of the plug, the upper right part shows the cross section of the plug, and the lower part shows the corresponding components inside the jack of the converged terminal. A metal shell is arranged outside the outer layer 21 of the plug to connect line a of the subscriber line. A metal core is arranged in the center of the inner layer 22 of the plug to connect line b of the subscriber line. An insulating layer 23 is configured to separate line a and line b. A groove 24 and a protrusion 27 are matched. After the plug is plugged into the jack, the protrusion is blocked inside the groove to prevent the plug from slipping off easily. Three contacts 25, 26 and 27 are positioned inside the jack, corresponding to line b1 inside the converged terminal, connection detection switch and line a1 inside the terminal respectively. In the above, contacts 25 and 27 are metal contacts. After the plug is pushed into the jack, lines a1b1 inside the terminal may be connected with line ab of the external subscriber line. The spring contact switch 28 may be connected with low level under the push of the contact 26 after the plug is plugged into the jack, in order to notify the central processor with the plug-in of the plug. When the plug is not plugged into the jack, the spring contact switch 28 is connected with high level to indicate to the central processor that the plug is not plugged into the jack.

The disclosure implements the convergence of the mobile terminal and the fixed terminal. The result can also be called the converged terminal. The solution performs communication by utilizing the related analogue subscriber line in the fixed communication network. The devices involved comprises: an MS (mobile converged terminal, also called converged terminal), a fixed telephone network and a mobile communication network.

Figure 3:
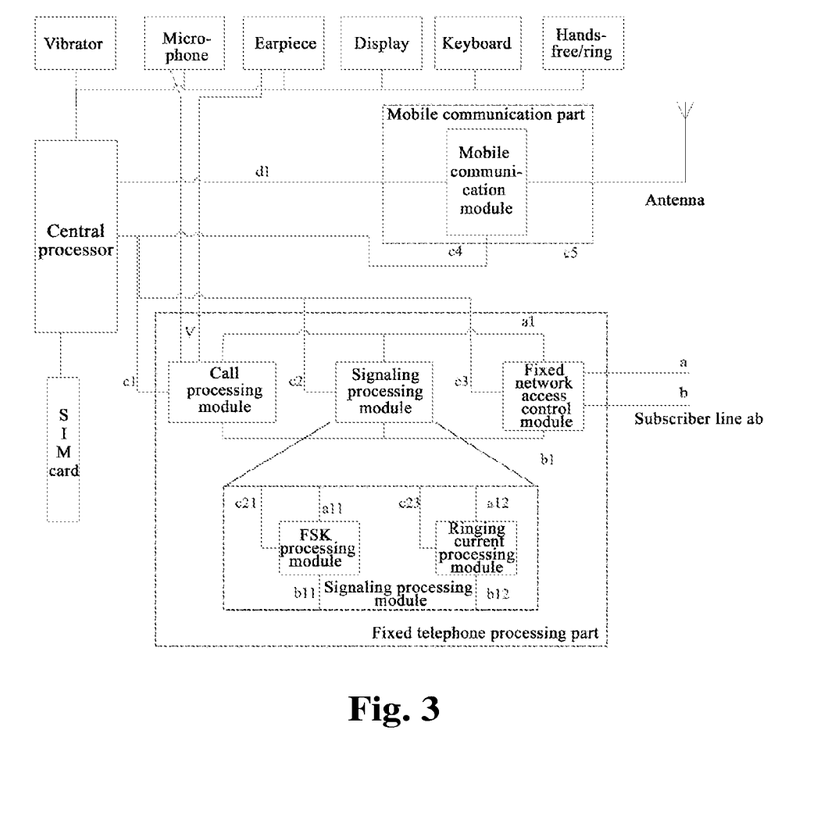
FIG. 3 is a specific structure block diagram of a converged terminal according to an embodiment of the disclosure.

FIG. 3 is a specific structure block diagram of a converged terminal according to an embodiment of the disclosure. As shown in FIG. 3, the converged terminal has two interfaces, one of which is a radio interface, and the other one is a subscriber line interface. The signaling on the radio interface is completely the same as that the signaling on the radio interface between the mobile terminal and the mobile communication network in the related technology. No repeated detail is given here. The physical medium and voice transmission of the subscriber line interface are completely the same as the physical medium and voice transmission on the interface between the analogue fixed telephone and the fixed communication network in the related technology. However, the new user signaling is formed of a group of messages and the corresponding interaction thereof. These messages are transferred on the subscriber line in the mode of Frequency-shift Keying (FSK), in order to implement the accessing and exiting of the terminal to and from the fixed network, the establishment and termination of calls, and the receiving and sending of short messages.

As shown in FIG. 3, the converged terminal consists of a mobile communication part, a fixed telephone processing part and a public part. In the above, the vibrator, the display, the keyboard, the microphone, the earpiece, the hands-free/ring are essential input/output modules in the related mobile terminal equipment, which are shared by the mobile communication part and the fixed telephone processing part in the converged terminal. The central processor may be a (digital) baseband processor in the related mobile terminal, and also may be an independent Central Processing Unit (CPU), for example, the CPU in a net book. The central processor is configured to overall control the actions of the converged terminal. The mobile communication part of the converged terminal completes the mobile communication function in the related technology, and opens and closes the radio frequency sending/receiving function of the mobile communication module under the control of the central processor.

The fixed telephone processing part of the converged terminal consists of a fixed network access control module, a signaling processing module and a call processing module. The signaling processing module further consists of an FSK processing module and a ringing current processing module. Inside the converged terminal, when the converged terminal is in the idle state, the ringing current processing module is connected with the line ab (i.e., subscriber line), and the subscriber line DC loop is disconnected. When the converged terminal is in a call, the ringing current processing module is disconnected with the subscriber line, and the subscriber line DC loop is connected, so that the call processing module is connected with the line ab. All these modules inside the converged terminal coordinately operate under the uniform control of the central processor to complete the call processing under the fixed telephone network mode.

The call processing module may connect or disconnect with the line ab under the control of the central processor, in order to implement and end the voice communication, and to implement 2/4 wire conversion, sidetone removal, sending and receiving of voice signals, and amplification of voice signals. The call processing module shares the earpiece and microphone modules with the mobile communication part. Therefore, the input/output of the call processing module from/to these modules must meet the corresponding technical requirements.

Under the control of the central processor, the signaling processing module implements all the signaling interaction functions between the converged terminal and the fixed telephone network. Two sub-modules in the signaling processing module may connect or disconnect with the line ab under the control of the central processor. When the converged terminal is in the idle state, the ringing current processing module is always connected with the line ab, to monitor the ringing signal (ringing current) that may appear on the line ab.

The fixed network access control module detects the plug-in and plug-out of the subscriber line plug in time, and notifies the central processor with the connection and disconnection between the converged terminal and the subscriber line, in order to start the processing logic of accessing and exiting the fixed network.

A plurality of different mobile converged terminals may access the fixed network through the same pair of analogue subscriber lines. Different mobile converged terminals are distinguished by their respective telephone numbers. When one mobile converged terminal serves as the calling terminal, the calling number of the outgoing call is the user number corresponding to the mobile converged terminal. When other users use the number of one mobile converged terminal as the called terminal, only the mobile converged terminal serving as the called terminal rings to its user. On the same pair of analogue subscriber lines, only one converged terminal can perform communication at each time, and the signaling processing module can identify whether there already is a call on the analogue subscriber lines.

The functions and operating process of the converged terminal in the embodiments of the disclosure is described in detail hereinafter with reference to specific flows.

Figure 4:
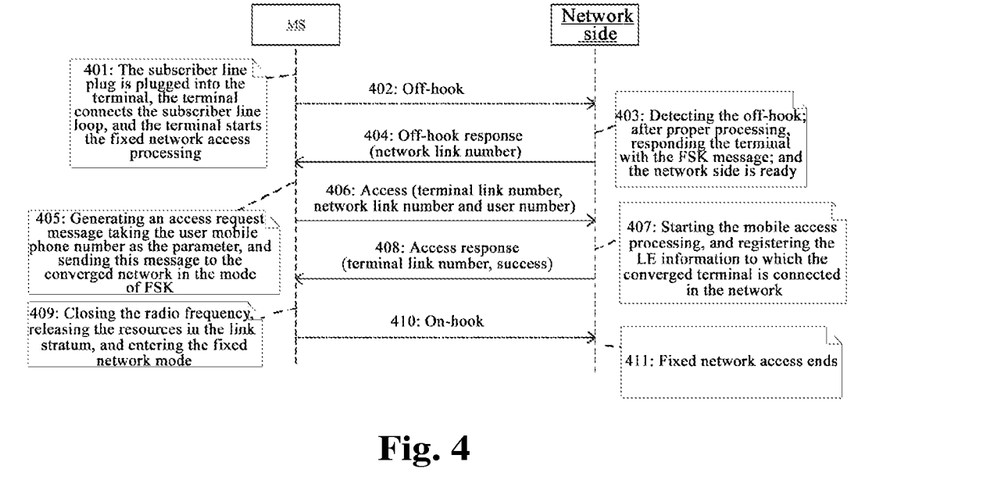
FIG. 4 is a processing flow chart of accessing the fixed telephone network when the converged terminal is in the idle state according to an embodiment of the disclosure.

FIG. 4 is a processing flow chart of accessing the fixed telephone network when the converged terminal is in the idle state according to an embodiment of the disclosure. As shown in FIG. 4, the flow comprises the following processing.

Step 401: After the subscriber line plug is plugged into the subscriber line jack of the converged terminal, the fixed network access control module in the converged terminal detects this event and reports it to the central processor. The central processor starts the processing of accessing the fixed telephone network when the terminal is idle, controls the electronic switch to connect the subscriber DC loop, connects the FSK processing module with the subscriber line, and simultaneously disconnects the ringing current processing module with the subscriber line, and receives the user signaling from the network side.

Step 402: After the subscriber loop is connected in the converged terminal, the subscriber interface circuit in the fixed telephone network may supply power to the subscriber line loop. The fixed telephone network detects this power supply, i.e., the off-hook. That is, the converged terminal sends an off-hook event to the fixed telephone network and waits for the response of the network side.

Step 403: After the fixed telephone network detects the off-hook event, the fixed telephone network starts the call processing, verifies the property of the port through which the network side is connected with the subscriber line (for example, whether the port is available; and if yes, continuing the following processing, otherwise, ending the flow), and allocates the local signaling link number (network link number) and other resources (such as call control block, call processing task etc.) required by this call.

Step 404: The fixed telephone network responds the off-hook event of the converged terminal, and sends an off-hook response message to the converged terminal to request to establish a signaling link, wherein the off-hook response message carries the network link number.

Step 405: After receiving the off-hook response message, the FSK processing module of the converged terminal sends this message to the fixed network access processing logic of the central processor. The fixed network access processing logic of the central processor continues to process the fixed network access of the terminal, allocates the local signaling link number (terminal link number) and other resources (such as memories, threads etc.) required by this call. Specifically, the central processor generates an access request message taking the user mobile phone number as the parameter, and sends this message to the FSK processing module.

Step 406: The FSK processing module of the converged terminal sends the access request message to the fixed telephone network, wherein the access request message carries the terminal link number, the user number of this terminal (mobile phone number) and the network link number.

Step 407: After receiving the access request message, the fixed telephone network coordinately completes the wired access processing of the converged terminal with the mobile communication network, and registers the information of the Local Exchange (LE) to which the converged terminal is connected through the subscriber line in the network.

Step 408: The fixed telephone network sends an access response message to the converged terminal to notify the converged terminal that the converged terminal successfully accesses the fixed telephone network, wherein the access response message carries the terminal link number and the information of successfully accessing the fixed telephone network.

Step 409: After receiving the response message, the converged terminal closes the radio frequency sending/receiving function, does not send/receive any radio waves any more, releases resources allocated for this access, and enters the fixed telephone network access operating mode.

Step 410: The central processor in the converged terminal disconnects the subscriber loop, i.e., on-hook. That is, the converged terminal sends an on-hook event to the fixed telephone network, and simultaneously the central processor connects the ringing current processing module with the subscriber lines.

Step 411: The fixed telephone network detects that the terminal is on-hook, and releases the related resources. This access processing ends.

Figure 5:
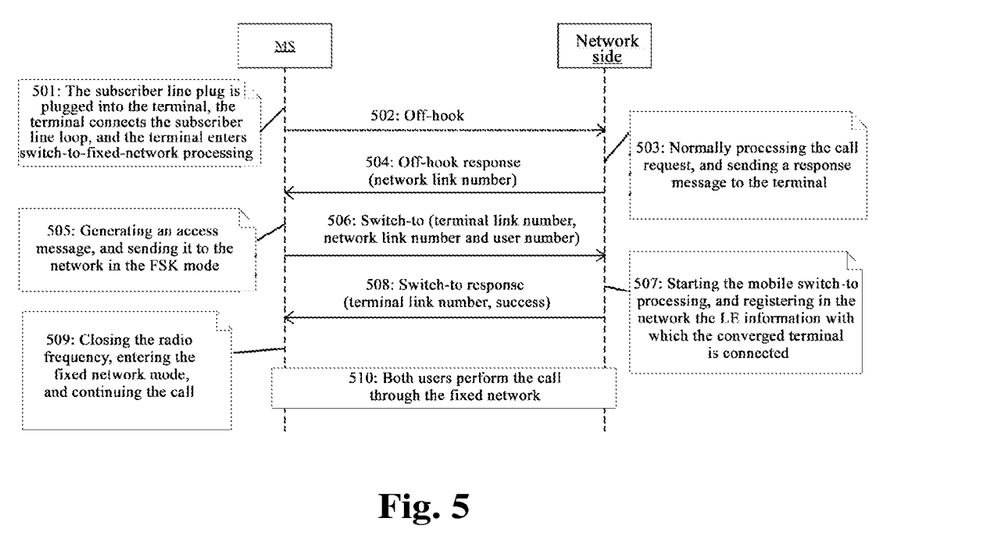
FIG. 5 is a processing flow chart of accessing the fixed telephone network when the converged terminal is in a call according to an embodiment of the disclosure.

FIG. 5 is a processing flow chart of accessing the fixed telephone network operating mode when the converged terminal is in a call according to an embodiment of the disclosure. As shown in FIG. 5, the flow comprises the following processing.

Step 501: When in a call, the user plugs the subscriber line plug into the subscriber line jack of the converged terminal. The fixed network access control module in the converged terminal detects this event and reports it to the central processor. The central processor starts the switch-to-fixed-network processing logic, and controls the electronic switch to connect the subscriber loop to connect the FSK processing module with the subscriber line.

Step 502: The converged terminal connects the subscriber loop. That is, the converged terminal sends an off-hook event to the fixed telephone network and waits for the response of the network side.

Step 503: After the fixed telephone network detects the off-hook event, the fixed telephone network starts the call processing. For example, verifying whether the port is available; and if yes, continuing the following processing, otherwise, ending the flow. And the fixed telephone network allocates the local signaling link number (network link number) and other resources (such as call control block, call processing task etc.) required by this call.

Step 504: The fixed telephone network responds the off-hook event of the converged terminal, and sends an off-hook response message to the converged terminal to request to establish a signaling link, wherein the off-hook response message carries the network link number.

Step 505: After receiving the off-hook response message, the FSK processing module of the converged terminal sends this off-hook response message to the central processor. The central processor analyzes the off-hook response message, and continues the switch-to processing of the converged terminal. The switch-to processing includes, for example, allocating the local signaling link number (terminal link number) and other resources (such as, task, call control block etc.) required by this call. Then, the central processor generates a switch-to message taking the user mobile phone number as the parameter, and sends this message to the FSK processing module.

Step 506: The FSK processing module of the converged terminal sends the switch-to message to the fixed telephone network, wherein the switch-to message carries the terminal link number, the number of the terminal user and the network link number.

Step 507: After receiving the switch-to message, the fixed telephone network coordinates with the mobile communication network to record the fixed telephone network location of the converged terminal in the network. That is, the fixed telephone network starts the switch-to processing, and registers in the network the identification information of the LE of the subscriber line with which the converged terminal is connected. Specifically, after the network completes the switch-to processing, the location where the terminal is connected with the fixed network will be recorded in the MSC, VLR or even HLR in the mobile network. The user data of the terminal and the correspondence relationship between the access port and the user number will also be recorded in the end office exchange where the fixed network is connected with the terminal.

Step 508: The fixed telephone network sends a switch-to response message to the converged terminal to notify the converged terminal that the converged terminal is successfully switched to the fixed telephone network, wherein the switch-to response message carries the terminal link number and information of successfully accessing the fixed telephone network.

Step 509: After the converged terminal receives the switch-to response message, the central processor connects the call processing module with the audio input/output module (microphone, earpiece), enters the fixed telephone network access operating mode, closes the radio frequency sending/receiving function, does not send/receive radio waves any more, and releases resources allocated for this switch-to.

Step 510: The converged terminal connects the audio input/output module with the call processing module, and the call processing module is connected with the subscriber line. Hence, the fixed network communication voice channel inside the terminal is connected. The fixed telephone network completes the switch-to processing of the terminal. The MSC of the mobile communication network cooperates with the accessed end office exchange of the converged terminal to switch the call from the mobile voice channel (for example, a voice channel consisting of a base station controller, a base station and a radio channel) to the fixed network voice channel with participation of the subscriber line and the accessed end office exchange. The two parties continue the call through the fixed telephone network.

Figure 6:
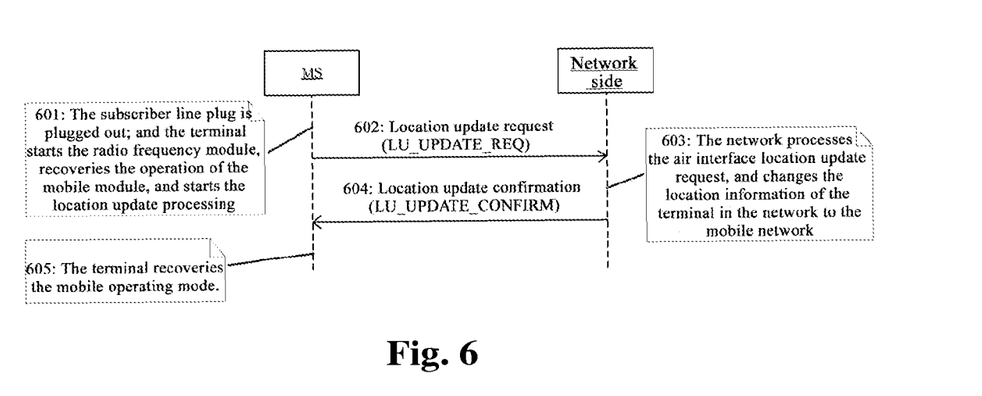
FIG. 6 is a processing flow chart of exiting the fixed telephone network when the converged terminal is in the idle state according to an embodiment of the disclosure.

FIG. 6 is a processing flow chart of exiting the fixed telephone network when the converged terminal is in the idle state according to an embodiment of the disclosure, i.e., a chart of the processing flow after the subscriber line plug is plugged out from the converged terminal in the idle state. As shown in FIG. 6, the flow comprises the following processing.

Step 601: After the subscriber line plug is plugged out from the converged terminal in the idle state, the fixed network access control module of the converged terminal detects the plug-out of the subscriber line plug, and notifies the central processor. The central processor indicates the mobile communication module to open the radio frequency sending/receiving function and starts the location update processing flow.

Step 602-Step 604: The converged terminal sends a location update request (LU_UPDATE_REQ) to the mobile communication network. The mobile communication network processes this location update request and changes the location information of the terminal in the network from the fixed telephone network to the mobile communication network. The mobile communication network sends a location update confirmation (LU_UPDATE_CONFIRM) message to the converged terminal and completes the location update of the converged terminal. In the above, the location update process is the same as the location update process in the related technology and is not described herein.

Step 605: The converged terminal enters the mobile access mode.

Figure 7:
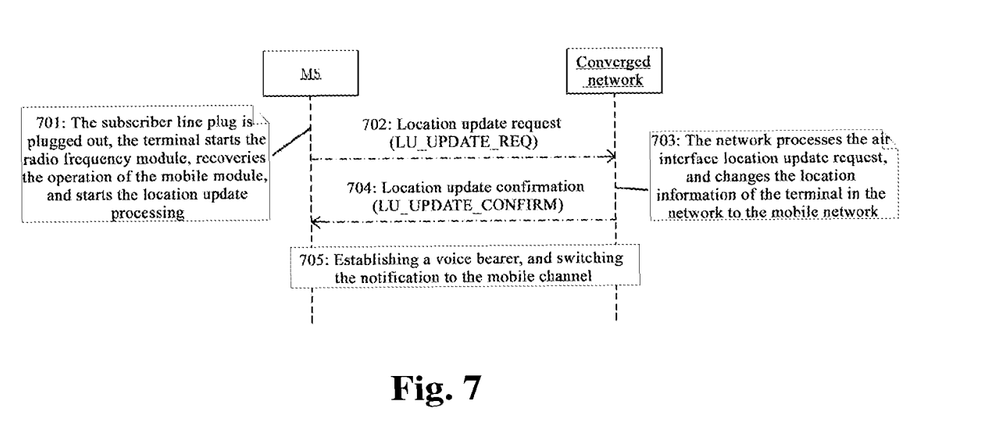
FIG. 7 is a processing flow chart that the converged terminal exits the fixed telephone network during a call according to an embodiment of the disclosure.

FIG. 7 is a processing flow chart that the converged terminal exits the fixed telephone network during a call according to an embodiment of the disclosure, i.e., a chart of the processing flow after the subscriber line plug is plugged out from the converged terminal that is in a call. As shown in FIG. 7, the flow comprises the following processing.

Step 701: After the subscriber line plug is plugged out from the converged terminal that is in a call, the fixed network access control module of the converged terminal detects the plug-out of the subscriber line plug. The central processor indicates the mobile communication module to open the radio frequency sending/receiving function and starts the location update processing flow.

Step 702-Step 704: The converged terminal sends a location update request to the mobile communication network, and the mobile communication network processes this location update request and changes the location information of the terminal in the network from the fixed telephone network to the mobile communication network. The mobile communication network sends a location update confirmation message to the converged terminal and completes the location update of the converged terminal. Inside the converged terminal, the audio input/output module is disconnected with the call processing module. That is, the fixed network communication voice channel inside the terminal is disconnected. In the above, the location update process is the same as the location update process in the related technology and is not described herein.

Step 705: Inside the converged terminal, the audio input/output module is connected with the central processor. That is, the radio communication voice channel inside the terminal is connected. The mobile communication network establishes a voice bearer with the converged terminal and switches the call to the bearer. Specifically, the mobile communication network cooperates with the converged terminal to establish a voice bearer with participation of the air interface and the corresponding radio access equipment (such as BSC and BS) in the mobile communication network, and switches the call to the mobile channel.

Figure 8:
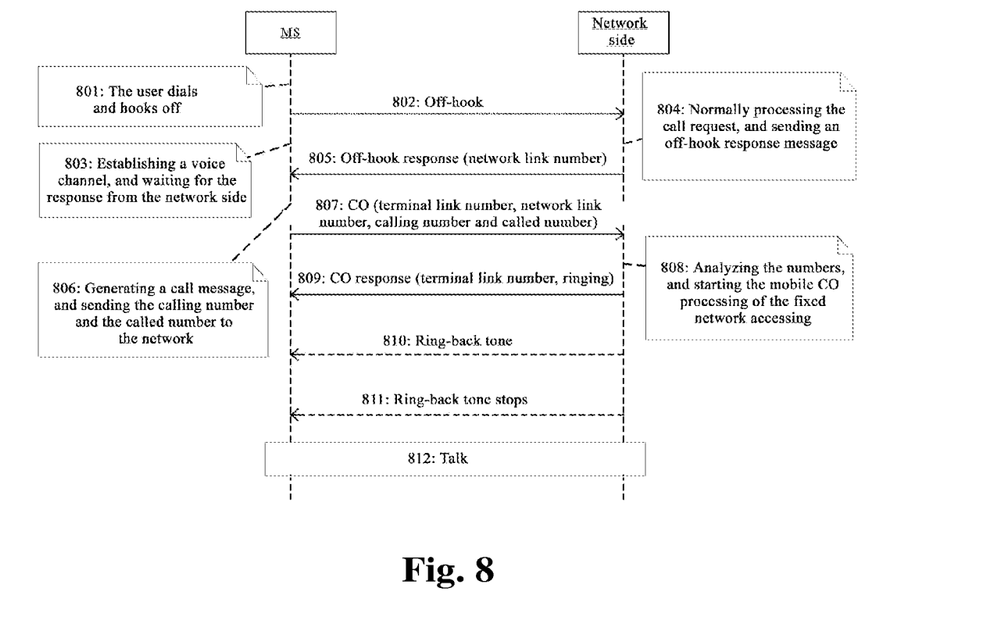
FIG. 8 is a flow chart of the processing that the converged terminal connected to the fixed telephone network initiates a call according to an embodiment of the disclosure.

FIG. 8 is a flow chart of the processing that the converged terminal connected to the fixed telephone network initiates a call according to an embodiment of the disclosure. As shown in FIG. 8, the flow comprises the following processing.

Step 801: After the user dials the number of the opposite user and presses the off-hook key (the operation is the same as that when the converged terminal is in the mobile access mode), the central processor of the converged terminal starts the call processing logic inside the terminal, allocates corresponding resources (call processing task, call control block etc.), and starts the FSK processing module, to monitor the response at the network side.

Step 802: The terminal sends an off-hook signal to the end office exchange by connecting the subscriber line loop.

Step 803: The terminal connects the audio input/output module (microphone, earpiece) with the call processing module, and establishes a voice channel inside the terminal, to facilitate the user to monitor the signal tone that may appear on the subscriber line.

Step 804: After detecting the off-hook of the user, the fixed telephone network starts the call processing and allocates the network link number.

Step 805: The fixed telephone network sends an off-hook response message to the converged terminal to respond the off-hook of the converged terminal, wherein the off-hook response message carries the allocated network link number.

Step 806: After receiving the off-hook response message, the converged terminal continues to process the call and to allocate the terminal link number.

Step 807: The converged terminal sends a Call Originated (CO) message to the fixed telephone network, wherein the CO message carries the network link number, the terminal link number, the calling number (i.e., the number of the converged terminal) and the called number.

Step 808: The fixed telephone network analyzes the calling number and the called number, and starts the CO processing of the fixed network accessing (this process is similar to that in the related technology and is1 not described herein).

Step 809: After the called terminal rings, the fixed telephone network sends a CO response message to the converged terminal. The CO response message carries the terminal link number and the ringing event indicator. The call at the network side enters the state of waiting for the off-hook of the called user. After the terminal receives the CO response message, the corresponding call processing also enters the state of waiting for the off-hook of the called user.

Step 810: During the period that the call waits for the off-hook of the called user, the fixed telephone network sends a ring-back tone to the converged terminal. The terminal sends the ring-back tone to the audio output module to be played. The user hears the ring-back tone.

Step 811: The called user hooks off. The fixed telephone network stops sending the ring-back tone to the converged terminal. The user may talk with the opposite user after hearing that the ring-back tone stops.

Step 812: The calling user and the called user talk with each other.

Figure 9:
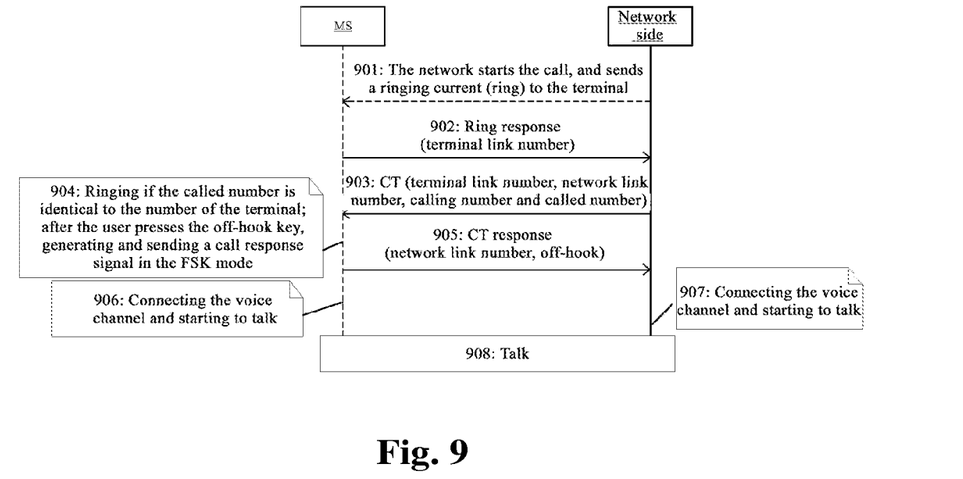
FIG. 9 is a flow chart of the processing that the converged terminal connected to the fixed telephone network receives a call according to an embodiment of the disclosure.

FIG. 9 is a flow chart of the processing that the converged terminal connected to the fixed telephone network receives a call according to an embodiment of the disclosure. As shown in FIG. 9, the flow comprises the following processing.

Step 901: After the incoming call request reaches the end office exchange at the network side, the end office exchange detects that the subscriber line to which the converged terminal is connected is idle. The end office exchange starts the incoming call processing logic, creates call processing task, and allocates call control block ect., and finally sends a ringing current to the subscriber line to which the converged terminal is connected.

Step 902: According to the flow shown in FIG. 5 of the embodiment of the disclosure, after the converged terminal accesses the fixed telephone network, the converged terminal in the idle state connects the ringing current processing module with the subscriber line. After monitoring the ringing current signal on the subscriber line, the ringing current processing module reports the ringing event to the central processor. The central processor starts the incoming call processing, creates call processing task, allocates the resources such as call control block and signaling link local identifiers (terminal link number), connects the FSK processing module with the subscriber line to receive messages from the network side, and sends a ringing response message to the network side to respond the ringing current signal at the network side. The ringing response message carries the terminal link number.

Step 903: The end office exchange of the fixed telephone network sends the call information to the converged terminal through the CT message, wherein the CT message carries the terminal link number, the network link number, the calling number and the called number.

Step 904: The converged terminal compares the received called number with its own user number. If the called number is identical to the user number of the terminal, the converged terminal sends the calling number to the display of the converged terminal to be displayed, and drives the hands-free/ring to ring, or drives the vibrator to vibrate, or by other way, to notify the user with the incoming call. And, the converged terminal continues the subsequent processing of the call. If the called number is not identical to the user number of the terminal, the converged terminal stops the processing of this call.

Step 905: The user hears the ring or senses other call prompts, and sees the calling number displayed on the display. If the user agrees to receive this call, the user presses the off-hook key. The central processor receives the off-hook event of the user, makes the call into the state of talking, and sends the CT response message to the network side through the FSK processing module to notify the network that the terminal user has hooked off. The CT response message carries the network link number.

Step 906: The converged terminal connects the call processing module with the subscriber line to connect the call loop.

Step 907: The fixed telephone network and the mobile communication network connect the corresponding voice channel.

Step 908: The calling user and the called user start to talk with each other.

Figure 10:
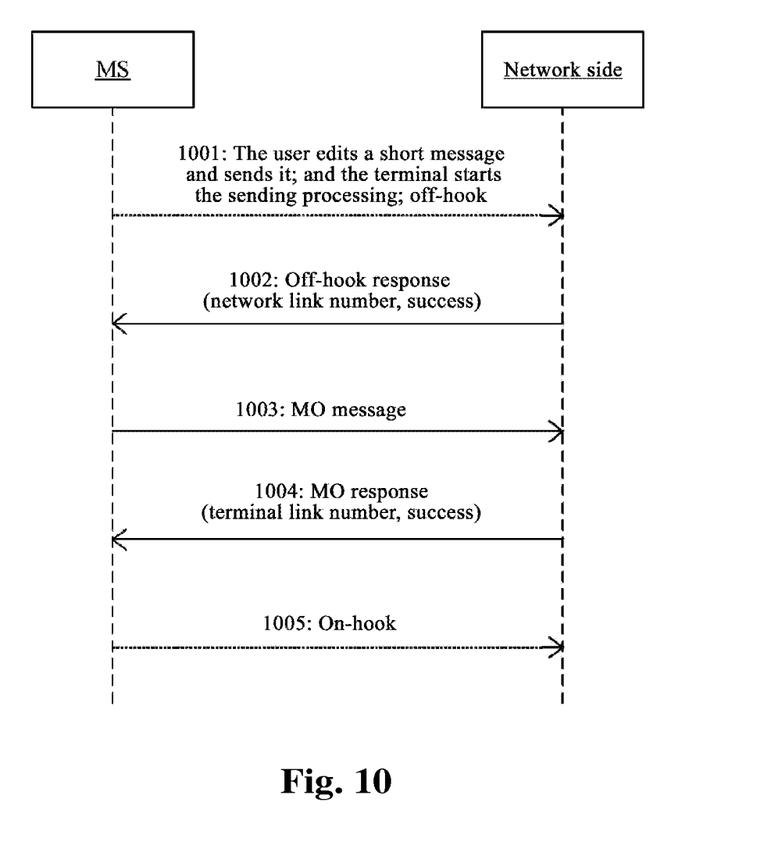
FIG. 10 is a flow chart of the processing that the converged terminal connected to the fixed telephone network sends a short message according to an embodiment of the disclosure.

FIG. 10 is a flow chart of the processing that the converged terminal connected to the fixed telephone network sends a short message according to an embodiment of the disclosure. As shown in FIG. 10, the flow comprises the following processing.

Step 1001: After the user uses the converged terminal to edit a short message and selects the sending function, the converged terminal starts the sending processing. The central processor connects the subscriber DC loop to send an off-hook signal to the fixed telephone network. The FSK processing module is connected with the subscriber line to receive messages from the network side.

Step 1002: After detecting the off-hook of the user, the fixed telephone network starts the call processing and allocates the network link number. Then, the fixed telephone network sends an off-hook response message to the converged terminal to respond the off-hook of the converged terminal, wherein the off-hook response message carries the allocated network link number.

Step 1003: After receiving the off-hook response message, the converged terminal continues the sending processing, allocates the terminal link number, generates a Message Originated (MO) message, and sends the MO message to the fixed telephone network through the FSK processing module. The MO message carries the calling number (i.e., the number of the converged terminal), the called number, the number of the short message service center, the contents of the short message, the network link number and the terminal link number, wherein the number of the short message service center is stored in the central processor in advance.

Step 1004: The fixed telephone network and the mobile communication network process the MO message, store the contents of the short message into the designated short message center, and send an MO response message to the converged terminal, wherein the MO response message carries the terminal link number and the confirmation information.

Step 1005: The FSK processing module of the converged terminal receives the MO response message and sends the MO response message to the central processor of the converged terminal. The central processor releases resources required for this sending, and disconnects the subscriber loop, i.e., on-hook. That is, the converged terminal sends an on-hook event to the fixed telephone network, and the sending process of the short message ends.

Figure 11:
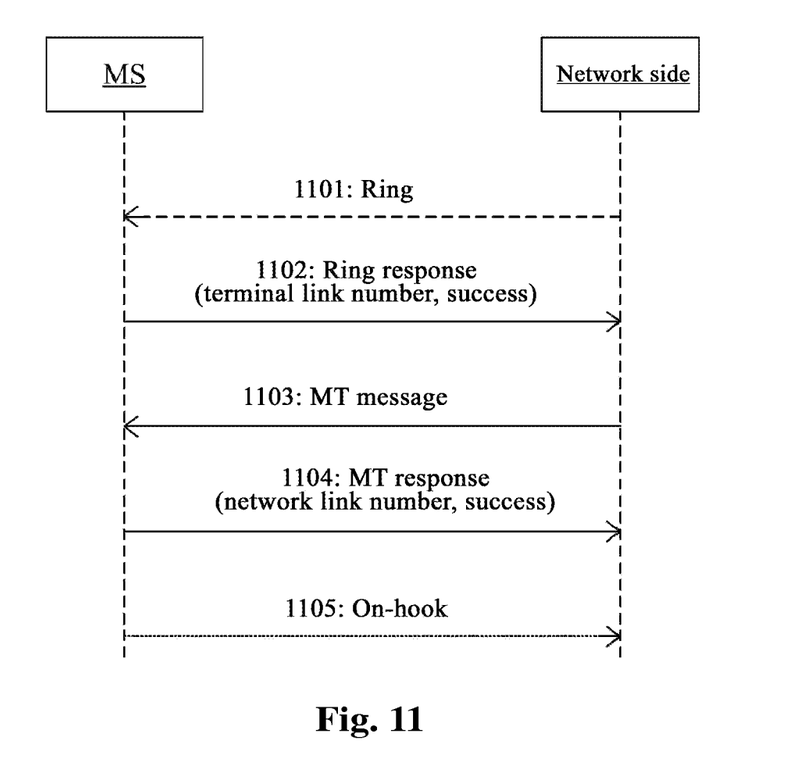
FIG. 11 is a flow chart of the processing that the converged terminal connected to the fixed telephone network receives a short message according to an embodiment of the disclosure.

FIG. 11 is a flow chart of the processing that the converged terminal connected to the fixed telephone network receives a short message according to an embodiment of the disclosure. As shown in FIG. 11, the flow comprises the following processing.

Step 1101: The fixed telephone network receives a short message sent to the converged terminal, starts the short message receiving processing, and when the converged terminal is in the idle state, sends a ringing current to the subscriber line to call the converged terminal.

Step 1102: The converged terminal detects the ringing current on the subscriber line, starts the call processing, creates the call processing task, allocates the terminal link number, connects the subscriber loop to connect the FSK processing module with the subscriber line, and sends a ringing response message to the fixed telephone network to respond the ringing current signal sent by the fixed telephone network. The ringing response message carries the terminal link number.

Step 1103: The fixed telephone network receives the ringing response message, continues the short message receiving processing, allocates the network link number, and sends a Message Terminated (MT) message to the converged terminal. The MT message carries the terminal link number, the network link number, the calling number, the called number (i.e., the number of the converged terminal), the contents of the short message and the receiving time.

Step 1104: The converged terminal receives and processes the MT message, and sends an MT response message to the fixed telephone network, wherein the MT response message carries the network link number and the successful confirmation information. The method for the terminal to process the short message is the same as the related mobile terminal technology, such as storing the short message, prompting the user of the arrival of the short message, displaying the contents of the short message according to the instruction of the user, deleting or forwarding the short message etc.

Step 1105: The converged terminal releases resources required to receive the short message, disconnects the subscriber DC loop, and connects the ringing current processing module with the subscriber line. That is, the terminal is hooked on, the terminal enters the idle state, and the receiving process of the short message ends.

The converged terminal in the embodiments of the disclosure accesses the fixed telephone network through the related analogue subscriber line. The fixed telephone network communication technology and the mobile network communication technology can be converged. The converged terminal accesses the fixed telephone network through the present large-scale 2-wire analogue subscriber telephone line. Therefore, communication is implemented effectively and conveniently by fully utilizing the fixed communication network resources and the flexibility of the mobile communication.

Above contents are only preferred embodiments of the disclosure and should not be used for limiting the disclosure. Any modifications, equivalent replacements and improvements within the principle of the disclosure should be contained within the protection scope of the disclosure.

What is claimed is:

1. A mobile terminal, comprising: a central processor, a fixed network access control module, a frequency shift keying processing module, a call processing module, a mobile communication module and an electronic switch module, wherein the fixed network access control module is connected with the central processor, comprises an analogue subscriber line interface, and is configured to connect the mobile terminal and an analogue subscriber line, and to notify the central processor that the mobile terminal is connected with a fixed telephone network when the analogue subscriber line is connected with the analogue subscriber line interface; the frequency shift keying processing module is connected with the central processor, and is configured to identify a signaling from the connected analogue subscriber line and send the signaling from the connected analogue subscriber line to the central processor, and to identify a signaling from the central processor and send the signaling from the central processor to the connected analogue subscriber line;

the call processing module is configured to extract a voice signal from the analogue subscriber line and send the voice signal from the analogue subscriber line to a voice output device of the mobile terminal to be played, and to send a voice signal from a user to the analogue subscriber line;

the mobile communication module is configured to achieve communication between the mobile terminal and outside based on a radio network; and the central processor is configured to process a signaling from the frequency shift keying processing module and send a signaling to be transmitted by the analogue subscriber line to the frequency shift keying processing module, and to control the electronic switch module to close a radio frequency sending/receiving function of the mobile communication module when the fixed network access control module notifies the central processor that the mobile terminal is connected with the fixed telephone network.

2. The mobile terminal according to claim 1, further comprising: a ringing current processing module, connected with the central processor, and configured to identify a ringing current signal from the analogue subscriber line and report a ringing corresponding to the ringing current signal to the central processor.

3. The mobile terminal according to claim 1, wherein the central processor is further configured to determine whether a called number received by the frequency shift keying processing module is a user number of the mobile terminal, and if yes, control the mobile terminal to continue to perform incoming call processing.

4. The mobile terminal according to claim 2, wherein the electronic switch module is further configured to, under control of the central processor, enable at least one of the frequency shift keying processing module, the call processing module and the ringing current processing module to be connected with the analogue subscriber line.

5. The mobile terminal according to claim 4, wherein
the central processor is further configured to control the electronic switch module to connect the ringing current processing module with the analogue subscriber line when the mobile terminal accesses the fixed telephone network.

6. The mobile terminal according to claim 4, wherein
the central processor is further configured to control the electronic switch module to connect the call processing module with the analogue subscriber line when the mobile terminal needs to perform voice communication.

7. The mobile terminal according to claim 4, wherein
the central processor is further configured to control the electronic switch module to connect the frequency shift keying processing module with the analogue subscriber line when the mobile terminal performs short message transmission.

8. The mobile terminal according to claim 1, wherein the mobile terminal further comprises an audio input module and an audio output module; and
the call processing module is further configured to send the voice signal from the user, which is input through the audio input module, to the analogue subscriber line, and send the voice signal from the analogue subscriber line to the voice output module.

9. The mobile terminal according to claim 1, wherein the central processor is a baseband processor or a central processing unit.

10. The mobile terminal according to claim 2, wherein the mobile terminal further comprises an audio input module and an audio output module; and
the call processing module is further configured to send the voice signal from the user, which is input through the audio input module, to the analogue subscriber line, and send the voice signal from the analogue subscriber line to the voice output module.

11. The mobile terminal according to claim 3, wherein the mobile terminal further comprises an audio input module and an audio output module; and
the call processing module is further configured to send the voice signal from the user, which is input through the audio input module, to the analogue subscriber line, and send the voice signal from the analogue subscriber line to the voice output module.

12. The mobile terminal according to claim 4, wherein the mobile terminal further comprises an audio input module and an audio output module; and the call processing module is further configured to send the voice signal from the user, which is input through the audio input module, to the analogue subscriber line, and send the voice signal from the analogue subscriber line to the voice output module.

13. The mobile terminal according to claim 5, wherein the mobile terminal further comprises an audio input module and an audio output module; and the call processing module is further configured to send the voice signal from the user, which is input through the audio input module, to the analogue subscriber line, and send the voice signal from the analogue subscriber line to the voice output module.

14. The mobile terminal according to claim 6, wherein the mobile terminal further comprises an audio input module and an audio output module; and the call processing module is further configured to send the voice signal from the user, which is input through the audio input module, to the analogue subscriber line, and send the voice signal from the analogue subscriber line to the voice output module.

15. The mobile terminal according to claim 7, wherein the mobile terminal further comprises an audio input module and an audio output module; and the call processing module is further configured to send the voice signal from the user, which is input through the audio input module, to the analogue subscriber line, and send the voice signal from the analogue subscriber line to the voice output module.

16. The mobile terminal according to claim 2, wherein the central processor is a baseband processor or a central processing unit.

17. The mobile terminal according to claim 3, wherein the central processor is a baseband processor or a central processing unit.

18. The mobile terminal according to claim 4, wherein the central processor is a baseband processor or a central processing unit.

19. The mobile terminal according to claim 5, wherein the central processor is a baseband processor or a central processing unit.

20. The mobile terminal according to claim 6, wherein the central processor is a baseband processor or a central processing unit.

* * * * *